Jan. 3, 1939.  M. PIPKIN ET AL  2,142,372
FLASH LAMP
Filed March 18, 1937
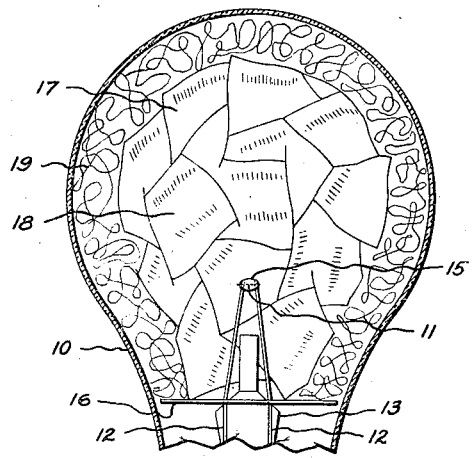
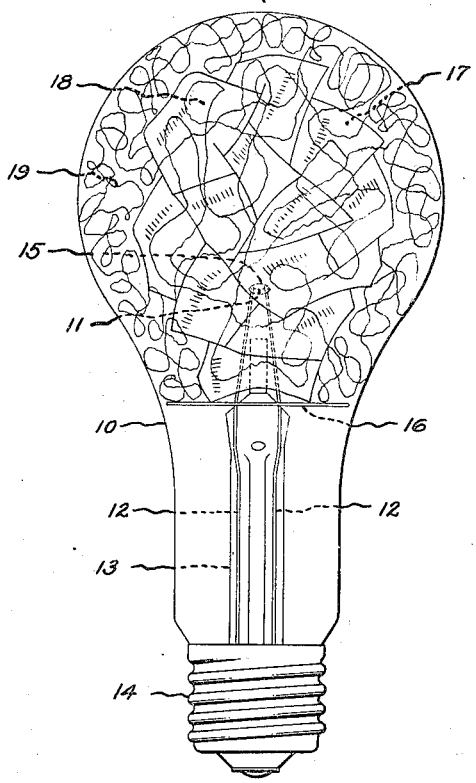
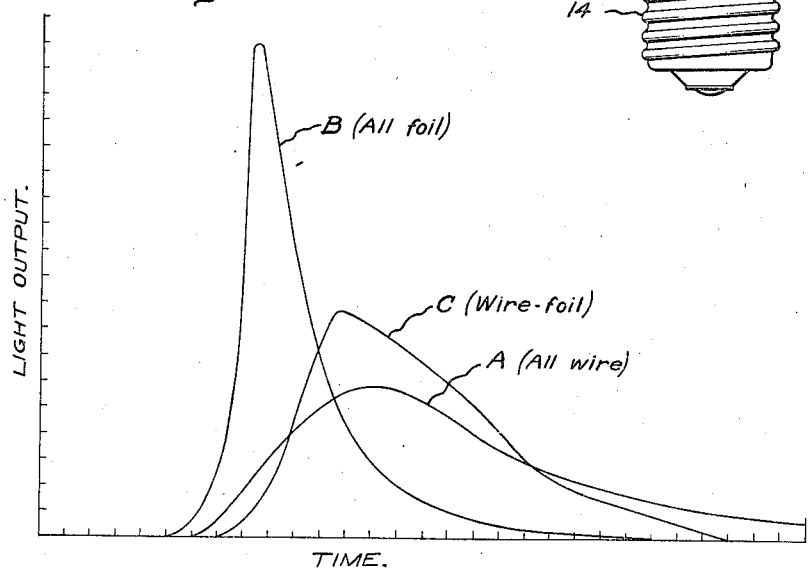
Inventors:
Marvin Pipkin,
Robert E. Worstell,
by Harry E. Dunham
Their Attorney.

Patented Jan. 3, 1939

2,142,372

UNITED STATES PATENT OFFICE 2,142,372

FLASH LAMP

Marvin Pipkin and Robert E. Worstell, Cleveland Heights, Ohio, assignors to General Electric Company, a corporation of New York Application March 18, 1937, Serial No. 131,614

6 Claims. (Cl. 67—31)

Our invention relates to flash lamps and more particularly to that type of flash lamp used for photographic purposes which usually comprises a sealed transparent envelope in which is enclosed a readily combustible material together with a substance, usually a gas filling, which, upon ignition, enters into a reaction with the combustible material with the resulting emission of actinic light.

The combustible material which has been found most suitable for this purpose consists of either a thin foil or wire of aluminum which, when ignited in an oxygen or oxygen-containing atmosphere, burns very rapidly with the emission of a substantial amount of actinic light. However, certain disadvantages are present in both the foil and wire flash lamps.

In foil flash lamps as manufactured at present the foil is loosely disposed in the bulb, and when flashed the degree of illumination rises from zero in a quickly rising curve to a sharp peak and then tapers off to zero. When taking a photograph at high shutter speed with such a foil flash lamp, it is obviously desirable to operate the shutter of the camera at the high intensity point of the light. The duration of the actinically effective portion of the flash is so short, usually about .005 to .010 of a second, that means for operating a shutter at the peak of the flash requires delicate and accurate synchronizing mechanism. This condition makes it difficult to obtain the best results, and it is especially necessary to provide flash lamps which will operate exactly alike. This is a difficult problem to contend with from a manufacturing standpoint, particularly since flash lamps are made to sell at a relatively low price and must be produced at a high rate of speed.

The foil flash lamp is also unsuited for use with cameras equipped with shutters of the focal plane type for the reason that the duration of the high intensity portion of the flash is appreciably shorter than the time required for the camera shutter slit to travel across the width of the sensitized film. Thus, even though the camera shutter is operated at the peak of the flash, various portions of the sensitized film will be exposed to a different degree of light intensity, resulting in inferior pictures.

Another disadvantage of the foil lamp is the incomplete combustion of that portion of the foil resting in contact with the glass of the bulb. When such a lamp is flashed, the cooling effect exerted by the glass on that portion of the foil in contact therewith either retards the rate of combustion of such portion of the foil or may even prevent any combustion of the same. Such a condition results in an appreciable loss in the amount of available actinic light.

In flash lamps employing fine drawn wire as the combustible material, the degree of illumination produced by the flash rises from zero in a slowly rising curve to a broadened peak of prolonged duration. This is due to the fact that wire is slow to ignite, and after ignition, burns at a comparatively slow rate. The broadened or flattened peak is a highly desirable feature, since it provides a prolonged period of time during which a camera shutter may be operated to expose the sensitized film to a comparatively high degree of illumination. However, the relatively long time required for the flash to rise to its broadened peak is undesirable from the standpoint of synchronization of camera shutter opening and flash peak, since considerable delay in shutter opening, after closing of the circuit through the flash lamp, is necessary to effectuate proper synchronization. Furthermore, a considerable portion of the actinic light produced by the flash is wasted during the prolonged period required for such flash to reach its peak. It is therefore evident that the desirable flash would be one which quickly rises from zero to a broadened or flattened peak of relatively high intensity and of prolonged duration.

One object of our invention is to provide a flash lamp which will emit a relatively high degree of light for a prolonged period of time.

Another object of our invention is to provide a flash lamp which will emit a flash of light characterized by a rapid rise from zero to a peak of maximum intensity, followed by an extended high intensity portion of prolonged duration.

Still another object of our invention is to provide a flash lamp containing combustible light-giving material so arranged as to quickly produce a prolonged concentrated flash of light.

A further object of the invention is to provide a flash lamp containing combustible material consisting of a combination of metal foil and either fine-drawn wire or metal ribbon.

A still further object of the invention is to provide a flash lamp containing combustible material consisting of a net or cushion of loosely arranged fine-drawn wire or metal ribbon enclosing a loosely arranged mass of metal foil, said foil thereby assisting in the ignition of the surrounding wire or ribbon and producing a rapid rise in the light flash from zero to a peak of maximum intensity.

Other objects and advantages of our invention will be more clearly understood by reference to the following description of an embodiment thereof and from the accompanying drawing in which:

Fig. 1 is an elevation of a flash lamp comprising our invention in which the combustible material consists of a loosely arranged mass of metal foil centrally disposed within the bulb and surrounded by a net or cushion of loosely arranged fine-drawn wire; Fig. 2 is a longitudinal sectional view of the upper portion of the lamp shown in Fig. 1; and Fig. 3 is a chart showing the light curves produced by an all-foil lamp, an all-wire lamp, and a lamp constructed in accordance with our invention and containing a combination of both foil and wire.

Referring to Fig. 1, the lamp comprises a vitreous transparent bulb 10 containing a small filament 11, the ends of which are connected to lead-in wires 12, 12 which extend through a stem 13 to the base 14. The filament 11 is embedded in a fulminating substance 15 to thereby form the ignition means for the lamp. A disc 16, preferably of asbestos, is mounted on the stem 13 to shield the base end of the lamp from the heat of combustion. The bulb 10 is loosely filled with combustible material 17, consisting of a combination of metal foil 18 and fine-drawn wire 19. The wire is preferably between 1.8 to 1.9 mils in diameter. The foil 18 and wire 19 may be either of aluminum and/or magnesium or alloys thereof, such for instance as those containing silicon, cerium, or zinc, or any other metal giving a white oxide upon combustion.

As is apparent from the drawing, the metal foil 18 is centrally disposed within the bulb so as to surround the fulminating substance 15, while the wire 19 is loosely arranged in a layer about the foil to serve as a net or cushion spacing such foil from the glass bulb. This particular disposition of the metal foil and wire within the bulb is essential in order to produce the desired flash of light.

From the flash curve A (Fig. 3) of an all-wire lamp, it is evident that the wire is relatively slow to ignite and requires a comparatively long period of time to reach its peak of maximum intensity. In contradistinction thereto, the flash curve B of an all-foil lamp shows that the foil quickly ignites and reaches its peak in a relatively short time. This property of the foil is therefore embodied in our combination wire-foil lamp by placing the foil immediately adjacent the fulminating substance 15. In this manner, the foil is instantly ignited the moment the fulminating substance ignites, thereby producing a flash of light which quickly rises from zero to a peak of maximum intensity.

Since the loosely arranged mass of foil 18 shields the wire 19 from the fulminating substance 15, the ignition of such wire is effected primarily by the combustion of the foil. Though the wire 19, as previously mentioned, is ordinarily slow to ignite, the rapid combustion of the loosely arranged mass of foil serves to accelerate the ignition of such wire. Accordingly, this acceleration of wire ignition causes the flash of light produced by the combustion of the wire to rise quickly and reach its maximum intensity in a shorter period of time than that ordinarily required by an all-wire lamp. However, the comparatively slow rate of combustion characteristic of such wire results in the production of actinic light of relatively high intensity for a prolonged period of time after the flash of light from the foil has reached its peak.

The resulting flash of light produced by the above described combined wire-foil lamp is indicated by curve C in Fig. 3. This curve clearly shows that there is a rapid rise in light intensity the moment the lamp is flashed, which rise is due to the rapid combustion of the foil 18. This rapid rise continues until the peak is reached, this being the point at which the combustion of the foil evolves the maximum degree of light intensity. By this time the combustion of the wire 19, due to the accelerating effect exerted thereon by the combustion of the foil, has progressed to the point where the light produced thereby approximates its maximum intensity. Thus, though the light from the combustion of the foil drops off sharply following the peak thereof, the slow rate of combustion characteristic of such wire produces the prolonged downwardly tapering end portion of the curve.

It will be seen, therefore, that our combination wire and foil lamp provides a source of illumination of the character of a flash which quickly attains its maximum intensity, as in the case of an all-foil lamp, and which furnishes light of comparatively high intensity over a relatively long period, as is characteristic of an all-wire lamp. Thus the operation of a camera shutter during the high intensity light period is greatly facilitated and the extreme degree of accuracy in synchronization and in the manufacture of uniformly operating lamps, as heretofore required, is not necessary. In addition, the prolonged high intensity light period adapts our lamp to use with cameras equipped with focal plane shutters, since the various portions of the sensitized film are more apt to be exposed to light of substantially the same degree of intensity. It is also evident, from a comparison of the curves shown in Fig. 3, that the degree of sustained illumination provided by our combination wire and foil lamp is considerably higher than that provided by an all-wire lamp, conditions being the same.

In certain types of photographic work, it is desirable to flash a plurality of lamps simultaneously to produce a greater amount of illumination. In the case of all-foil lamps, this simultaneous flashing may be advantageously accomplished by simply grouping the several lamps together in close relationship and flashing only one of their number, the heat absorbed by the foil in the various other lamps from the one lamp flashed being sufficient to ignite such other lamps. This desirable characteristic is not present in all-wire lamps, but instead, each individual lamp must be separately flashed. However, our combination wire and foil lamp still possesses this same characteristic of all-foil lamps, due to the presence of a sufficient quantity of foil in each lamp to absorb heat from the lamp flashed and to thus become ignited.

By placing the loosely arranged wire 19 adjacent the glass bulb 10, the area of combustible material in contact with the glass of the bulb is considerably reduced over that in contact with the glass in the case of an all-foil lamp. In this manner, the complete combustion of all the combustible material within the lamp is promoted, the glass exerting less cooling effect on such combustible material.

The same effect produced by our combination wire and foil lamp, namely, quick illumination of high intensity for a relatively long period, may be obtained to a substantial degree by substituting metal ribbon for the wire. Thus, a combined ribbon and foil lamp will provide illumination of relatively high intensity for a longer period of time than that produced by an all-foil lamp but shorter than that produced by an all-wire lamp. The ribbon may be formed by flattening wire of a diameter between 1.8 to 1.9 mils and of the above-mentioned composition.

The proportions of wire and foil or of ribbon and foil, as the case may be, may be varied to give the particular flash of light desired. Thus, increasing the proportion of foil tends to shorten the duration of the high intensity portion of the flash with consequent increase in the degree of intensity of the peak, while increasing the proportion of wire or ribbon tends to prolong the duration of such high intensity portion with resulting decrease in the degree of intensity of the peak.

Although a preferred embodiment of the invention is shown and described herein, it should be understood that modifications may be made therein without departing from the spirit and scope of the invention as described herein and as set forth in the appended claims.

In the appended claims, the expression "filamentary material" is used to describe either the fine wire or ribbon referred to above.

What we claim as new and desire to secure by Letters Patent of the United States is:

1. A flash lamp comprising a sealed container and a quantity of combustible material within said container, said combustible material consisting of a loosely arranged mass of metal foil and combustible metallic filamentary material.

2. A flash lamp comprising a sealed container and a quantity of combustible material within said container, said combustible material comprising a loosely arranged mass of metal foil substantially enclosed within a net of loosely arranged combustible metallic filamentary material.

3. A flash lamp comprising a sealed container and a quantity of combustible material within said container, said combustible material consisting of a loosely arranged mass of aluminum foil and combustible metallic filamentary material.

4. A flash lamp comprising a sealed container and a quantity of combustible material within said container, said combustible material consisting of a loosely arranged mass of metal foil and aluminum filamentary material.

5. A flash lamp comprising a sealed container and a quantity of combustible material within said container, said combustible material consisting of a loosely arranged mass of aluminum foil and aluminum filamentary material.

6. A flash lamp comprising a sealed container, a quantity of combustible material within said container, and means for igniting said combustible material, said combustible material consisting of a loosely arranged mass of metal foil disposed adjacent said ignition means and surrounded by a layer of loosely arranged combustible metallic filamentary material.

MARVIN PIPKIN.
ROBERT E. WORSTELL.